United States Patent [19]

Yoshikane et al.

[11] Patent Number: 4,915,539

[45] Date of Patent: Apr. 10, 1990

[54] WEAR RESISTANT PAVEMENT STRUCTURE

[75] Inventors: Toru Yoshikane; Hiromitsu Nakanishi; Shinichi Takei; Tatsushi Kajino, all of Nagoya, Japan

[73] Assignee: Taiyu Kensetsu Kabushiki Kaisha, Nagoya, Japan

[21] Appl. No.: 285,613

[22] Filed: Dec. 16, 1988

[30] Foreign Application Priority Data

Dec. 28, 1987 [JP] Japan .................................. 62-335241

[51] Int. Cl.⁴ .............................................. E01C 5/06
[52] U.S. Cl. .......................................... 404/31; 404/82
[58] Field of Search ....................... 404/27, 31, 81, 82, 404/71, 17; 428/308.4

[56] References Cited

U.S. PATENT DOCUMENTS

| Re. 16,799 | 11/1927 | Burdge | 404/31 |
| 3,038,393 | 6/1962 | Nagin et al. | 404/31 |
| 3,112,681 | 12/1963 | Gessler et al. | 404/31 |
| 3,114,304 | 12/1963 | Delmonte | 404/31 |
| 3,165,036 | 1/1965 | Schmidt | 404/31 |

FOREIGN PATENT DOCUMENTS 2519042  7/1983  France .................................. 404/31

*Primary Examiner*—William P. Neuder
*Attorney, Agent, or Firm*—Dennison, Meserole, Pollack & Scheiner

[57] ABSTRACT

A pavement structure includes a skeleton concrete formed by evenly spreading a mixture containing as principal components not less than 30% by volume of coarse aggregate, 2% to 20% by volume of cement and 3% to 20% by volume of water, the skeleton concrete including voids which are filled with a fluid material containing a thermosetting resin as a principal component.

20 Claims, No Drawings

WEAR RESISTANT PAVEMENT STRUCTURE

BACKGROUND OF THE INVENTION

1. Field of the Invention

The present invention relates to a pavement structure (hereinafter referred to merely as pavement) having good wear resistance, and more particularly to such pavement comprising a skeleton concrete formed by evenly spreading a mixture of aggregate, cement and water, the skeleton concrete including proper voids which are filled with a fluid material.

2. Description of the Prior Art

Conventionally, bituminous mixture, cement concrete or resin concrete is used for pavement. Bituminous pavement is advantageous in readiness of application and the most wide-spread pavement at present. However, the bituminous pavement is disadvantageous in that under a hot weather condition as in summer, plastic flow will be caused by repeated wheel load and the flatness of the pavement will be impaired, while in winter, it is quite readily subject to wear by studded tires and tire chains employed when driving on a snowy or icy road.

Cement concrete pavement causes no such plastic flow under a hot weather condition in summer, but it requires many days to be cured for construction and thence, traffic must be suspended during the curing period. In addition, as with the bituminous pavement, the cement concrete pavement suffers from wear by studded tires and tire chains employed in winter. Though the wear loss is slightly smaller than that of the bituminous pavement, it must be repaired, such as, by a process of overlaying a thin layer of a cement concrete material. The process requires drastically large cost and labor in comparison with bituminous pavement, and furthermore, the thickness of the layer is inevitably limited by the maximum size of aggregate.

In resin concrete pavement, wear loss is small in comparison with the above two types of pavement, nevertheless remaining to be a serious problem. In addition, because of limitation in handling time of the resin in use, special equipment is required for mixing and applying operation. Thus, the resin concrete pavement is not widely used at present, and it is sometimes used only for partial repair.

In recent years, block pavement using polymer-impregnated concrete blocks is applied for improved wear resistance. However, it requires manufacturing of such blocks including the steps of formation, deairing, and impregnation and polymerization of polymer in the factory, and setting the blocks one by one at the job site. Thus, it is disadvantageous in that it requires much cost and labor for construction. When the block pavement is used to repair a pavement, the existing road surface must be smoothly graded such as by deeply scraping the road surface, which further increases labor and cost for construction.

As described above, the serious problem of wear caused by studded tires and tire chains involved in the conventional paving technique has not been overcome by any of the above described types of pavement which cannot provide satisfactory performance and workability.

SUMMARY OF THE INVENTION

It is an object of the present invention to overcome the above disadvantages associated with the prior art pavement by providing pavement which has remarkably improved resistance to wear caused by studded tires and tire chains as well as good workability.

The inventors have made much research to overcome the above serious problems involved in the prior art pavement and found an inventive pavement structure which has very good wear resistance and which permits ease of operation.

According to an aspect of the present invention, there is provided a pavement structure comprising a skeleton concrete formed by evenly spreading a mixture containing as principal components not less than 30% by volume of coarse aggregate, 2% to 20% by volume of cement and 3% to 20% by volume of water, the skeleton concrete including voids which are filled with a fluid material containing a thermosetting resin as a principal component.

According to a second aspect of the present invention, there is provided a pavement structure comprising a skeleton concrete formed by evenly spreading a mixture containing as principal components not less than 30% by volume of coarse aggregate, not more than 25% by volume of fine aggregate, 2% to 20% by volume of cement and 3% to 20% by volume of water, the skeleton concrete including voids which are filled with a fluid material containing a thermosetting resin as a principal component.

From the research on the actual condition of the conventional pavement, it is well known that in the pavement surface, asphalt mortar or cement mortar portion containing aggregate having a grain diameter less than 2.5 mm (hereinafter referred to as fine aggregate) is worn away, by studded tires and tire chains, more than the portion containing aggregate having a grain diameter not less than 2.5 mm (hereinafter referred to as coarse aggregate), and consequently that more amount of coarse aggregate results in higher wear resistance. However, in the conventional pavement, even if the mixture containing much coarse aggregate can be prepared, a binder is not strong enough to prevent coarse aggregate grain from falling off due to shock given by studed tires and tire chains. Therefore, the effect can not be satisfactorily achieved.

From the above described point of view, a mixture is prepared, containing fine aggregate and cement paste composed of cement and water in the amount as small as possible, and further containing coarse aggregate in the amount as large as possible, and it is evenly spread to form a skeleton concrete. Because of small amounts of fine aggregate and cement paste composed of cement and water contained therein, the skeleton concrete includes voids, which are filled with a fluid material containing as a principal component a thermosetting resin having good wear resistance. The wear resistance of the skeleton concrete itself and the wear resistance of the fluid material effectively coact, and coarse aggregate is firmly combined by the fluid material, so that the pavement thus constructed has, as a whole, more improved wear resistance than has ever been achieved. The base on which the mixture is spread may be an existing road surface of cement concrete, asphalt concrete, gravel or earth.

In both aspects of the present invention, cement and water constituting the skeleton concrete has the principal functions of combining aggregate to improve evenly spreading ability of the mixture when applied, so that a stable working surface can be provided for filling the fluid material, and of packing a part of voids among aggregate so as to adjust the void ratio of the skeleton concrete. As soon as cement paste is set, the fluid material can be filled, and after the fluid material is cured, the pavement can be open to the traffic. Thus, the paving technique of the present invention may greatly improve workability in comparison with the prior art paving such as of cement concrete, resin concrete or polymer-impregnated concrete blocks.

DETAILED DESCRIPTION OF THE INVENTION

The aggregate used in the formation of the invention skeleton concrete may be natural gravel, sand, crushed stone, artificial aggregate, slag, metal grain or the like. Preferably, the coarse aggregate should be hard and have good wear resistance. In addition, the amount of coarse aggregate should preferably be as large as possible, and at least 30% or more by volume of the whole skeleton concrete, while the mixing proportion by volume of fine aggregate must be in the range from 0% to 25%. In case the mixing proportion of coarse aggregate is less than 30% or that of fine aggregate is above 25%, the resulting pavement cannot show an eminently improved wear resistance. Any cement may be used, provided, when it is mixed with water, reaction proceeds to develop strength. From the point of hydration speed and strength obtained after reaction, portland cement such as normal cement and ultra-rapid hardening cement, blended cement such as blast furnace cement, fly ash cement and silica cement, and air-setting cement such as gypsum are preferable. Cement is mixed with water to form cement paste, which has the principal functions of combining aggregate for improved applicability and stability just after application and adjusting the void ratio of the skeleton concrete by packing a part of voids among aggregate. For this purpose, the mixing proportion by volume of cement must be in the range from 2% to 20%, and that of water must be in the range from 3% to 20%.

The skeleton concrete can be prepared and applied by various methods. In general, it can be easily applied by being mixed in a forced stirring mixer, evenly spread by a conventional asphalt paver and compacted by a road roller. The skeleton concrete thus formed typically has the void ratio in the range from 10% to 40%.

The fluid material may be a thermosetting resin or mixture thereof with a filler. The thermosetting resin is selected to have good wear resistance, good mechanical stability, good chemical stability, good heat resistance and others, and particularly, epoxy resin, unsaturated polyester resin, methyl methacrylate and polyurethane resin are preferable. Preferably, the filler may be limestone powder, cement, fly ash, slag powder or the like. The mixing proportion of the filler to the resin is not specifically limited, provided that the fluid material may have such a viscosity as to allow flow thereof into voids in the skeleton concrete. Satisfactory viscosity of the fluid material during the filling operation is such that in a J-type funnel tube flow time, the flow time is not more than nearly 200 seconds. A part of the filler may be replaced by pigment such as red oxide and titanium oxide to obtain color pavement.

Even if the filling operation is started immediately after the skeleton concrete is applied, satisfactory wear resistance and mechanical stability may be obtained after the fluid material is hardened. In case the application area is large or the skeleton concrete surface is directly used as a working surface, the filling operation is preferably carried out, after the uniaxial compression strength of the skeleton concrete becomes not less than 5 kgf/cm$^2$, so as to reduce hardening shrinkage or obtain a stable working surface. In case the cement in the skeleton concrete is early-strength portland cement, curing about 5 hours provides the uniaxial compression strength of 5 kgf/cm$^2$ or more.

The filling operation can be carried out by evenly spreading the fluid material onto the surface of the skeleton concrete by rubber rakes or the like, which causes natural flow of the fluid material into voids. The operation may be acclerated by using pressurizing or pressure-reducing means, if required. Preferably, the amount of the fluid material is large enough to substantially fully pack voids in the skeleton concrete. In case the skeleton concrete is formed thick, a double-layer structure may be provided including a cement paste in the lower portion of the skeleton concrete and a fluid material in the upper portion of the skeleton concrete. After the filling operation of the fluid material, hard aggregate of about 2.5 mm in grain diameter having acute edges, such as, silica sand, crushed stone, artificial aggregate and emery may be spread on the surface, before the fluid material has been hardened so as to improve skid resistance of the surface. The time period required from filling of the fluid material to restoration of the traffic is determined by the type of the thermosetting resin to be used, the amount of an accelerator, or ambient temperature during the operation. In general, the filling material may satisfactorily be hardened in about 5 hours.

The practice of the present invention may be seen in the following examples.

EXAMPLE 1

For preparation of skeleton concrete, coarse aggregate of crushed stone (A) of hard sandstone having a grain diameter of 5 to 13 mm and of crushed stone (B) of hard sandstone having a grain diameter of 2.5 to 5 mm, fine aggregate having a grain diameter not more than 2.5 mm, and early-strength portland cement were used. The skeleton concrete was mixed in a biaxial pug mill mixer. To determine the design mixing proportion of the components, unit weight of aggregate only was measured, and the measurement was divided by the specific gravity of the aggregate to obtain the percentage of absolute volume, which was used as mixing proportion by volume of the aggregate. Then, the design void ratio was determined, and finally the mixing proportion by volume of cement paste was determined, so that the total of the mixing proportion by volume of aggregate, the design void ratio and the mixing proportion by volume of cement paste may make 100%. Various compositions used in the example are shown in Table I.

As a thermosetting resin constituting the fluid material, an epoxy resin (hereinafter referred to as EP) or unsaturated polyester resin (hereinafter referred to as UP) was used. The fluid material was prepared by mixing 100 parts by weight of EP produced by Sho-Bond Kagaku Ltd. under the tradename "Sho-Bond #303" or UP produced by Dainippon Ink & Chemicals, Inc. under the tradename "Beckacite U 400" with 2 parts by weight of 0.6% cobalt naphthenate as an accelerator and 1 part by weight of methyl ethyl ketone peroxide as a catalyst. Limestone powder or cement was used as a filler. Various compositions of the fluid material used in the example are shown in Table II.

In this example, the skeleton concrete having the composition shown in Table I was formed in thickness of 5 cm, and the fluid material shown in Table II was spread onto the skeleton concrete to have voids in the skeleton concrete substantially fully packed therewith. Then, the wear resistance of the pavement thus obtained was tested. The combination of the compositions of the skeleton concrete and the fluid material is shown in Table III.

TABLE I

| Comp. No. | 1 | 2 | 3 | 4 | 5 | 6 | 7 | 8 |
|---|---|---|---|---|---|---|---|---|
| Water-Cement Ratio (%) | 35 | 35 | 35 | 35 | 35 | 35 | 35 | 35 |
| FA*[1] Ratio (%) | 40.0 | 21.8 | 0 | 0 | 0 | 0 | 0 | 0 |
| Void Ratio (%) | 21.18 | 20.0 | 30.0 | 15.0 | 10.0 | 40.0 | 30.0 | 20.0 |
| Unit Amt. of water (kg/m$^3$) | 110.7 | 131.5 | 83.3 | 161.9 | 188.1 | 30.9 | 884.3 | 136.6 |
| Type of CA*[2] | A | A | A | A | A | A | B | B |
| Mixing Propn. by Volume (l/m$^3$) | | | | | | | | |
| CA | 346.2 | 439.7 | 541.0 | 541.0 | 541.0 | 541.0 | 539.0 | 539.0 |
| FA | 230.8 | 209.3 | 0 | 0 | 0 | 0 | 0 | 0 |
| Cement | 100.5 | 119.2 | 75.7 | 147.8 | 170.9 | 28.1 | 76.7 | 124.4 |
| Water | 110.7 | 131.5 | 83.3 | 161.9 | 188.1 | 30.9 | 84.3 | 136.6 |
| Void | 211.8 | 200.0 | 300.0 | 150.0 | 100.0 | 400.0 | 300.0 | 200.0 |
| Mixing Propn. by Weight (kg/m$^3$) | | | | | | | | |
| CA | 934.7 | 1174.4 | 1445.0 | 1445.0 | 1445.0 | 1445.0 | 1439.7 | 1439.7 |
| FA | 623.2 | 293.4 | 0 | 0 | 0 | 0 | 0 | 0 |
| Cement | 316.7 | 376.3 | 238.3 | 463.2 | 538.3 | 88.5 | 241.3 | 391.1 |
| Water | 110.7 | 131.5 | 83.3 | 161.9 | 188.1 | 30.9 | 84.3 | 136.6 |

*[1]FA = Fine Aggregate
*[2]CA = Coarse Aggregate

TABLE II

| | Thermosetting Resin | | Filler | |
|---|---|---|---|---|
| No. | Type | Amount (% by wt) | Type | Amount (% by wt) |
| a | EP | 100 | — | — |
| b | UP | 100 | — | — |
| c | UP | 60 | Limestone Powder | 40 |
| d | UP | 32.4 | Limestone Powder | 67.6 |
| e | UP | 31.7 | Normal Portland Cement | 68.3 |

TABLE III

| Combination No. | Skeleton Concrete Comp. No. | Fluid Material Comp. No. |
|---|---|---|
| 1-a | 1 | a |
| 1-c | 1 | c |
| 2-c | 2 | c |
| 3-c | 3 | c |
| 3-d | 3 | d |
| 3-e | 3 | e |
| 4-b | 4 | b |
| 4-c | 4 | c |
| 5-b | 5 | b |
| 6-d | 6 | d |
| 7-b | 7 | b |
| 8-b | 8 | b |

In reference pavements, granular gap-graded asphalt concrete (13F) which is most usually used in cold districts, portland cement concrete which is used for conventional pavements, resin concrete and polymer-impregnated concrete block were tested. The compositions of the references are shown in Table IV.

TABLE IV

| Ref. No. | 1 | 2 | 3 | 4 | 5 | 6 |
|---|---|---|---|---|---|---|
| Name | Granular Gap-Graded Asphalt Concrete | Normal Portland Cement Concrete | Resin Concrete by MMA*[1] | Resin Concrete by EP | Resin Concrete by UP | Polymer-Impregnated Concrete Block |
| Comp. | CS*[2] No. 6 (% by wt) 27.0 | CA*[3] (kg/m$^3$) 1204 | CS No. 6 (% by wt) 27.8 | CS No. 6 (% by wt) 27.8 | CS No. 6 (% by wt) 27.6 | |
| | CS No. 7 (% by wt) 14.9 | FA*[4] (kg/m$^3$) 630 | CS No. 7 (% by wt) 24.1 | CS No. 7 (% by wt) 24.1 | CS No. 7 (% by wt) 24.0 | |
| | Screenings (% by wt) 9.3 | Cement (kg/m$^3$) 353 | Sand (% by wt) 33.1 | Sand (% by wt) 33.1 | Sand (% by wt) 32.9 | |
| | Sand (% by wt) | Water (kg/m$^3$) | Filler (% by wt) | Filler (% by wt) | Filler (% by wt) | |

TABLE IV-continued

| Ref. No. | 1 | 2 | 3 | 4 | 5 | 6 |
|---|---|---|---|---|---|---|
| | 31.6 Filler (% by wt) 10.2 Asphalt (% by wt) 7.0 | 148 Additive (kg/m³) 1.130 | 6.0 MMA (% by wt) 9.0 | 6.0 MMA (% by wt) 9.0 | 6.0 MMA (% by wt) 9.5 | |

*[1] MMA = Methyl Methacrylate
*[2] CS = Crushed Stone
*[3] CA = Coarse Aggregate
*[4] FA = Fine Aggregate A wear test was carried out by driving two bias snow tires (145 kg wheel load, 5.00–10 4PR, 64 pins) at a speed of 20 km/h (with the wheel running at 13,428 pass/h) for 30 hours on a simulation pavement surface prepared by arranging 12 trapezoidal test pieces in a circle in a room at a constant temperature of 0° C., and thereafter wear loss was measured. The results are shown in Table V.

TABLE V

| | Composition No. | Wear Loss mm |
|---|---|---|
| Example 1 | 1-a | 1.757 |
| | 1-c | 2.045 |
| | 2-c | 1.072 |
| | 3-c | 0.654 |
| | 3-d | 0.659 |
| | 3-e | 1.804 |
| | 4-b | 1.278 |
| | 4-c | 1.138 |
| | 5-b | 1.402 |
| | 6-d | 0.702 |
| | 7-b | 2.000 |
| | 8-b | 1.840 |
| Reference | 1 | 7.600 |
| | 2 | 5.187 |
| | 3 | 3.482 |
| | 4 | 3.708 |
| | 5 | 2.867 |
| | 6 | 2.926 |

As is apparent from Table V, the pavement prepared in Example 1 is superior in wear resistance to bituminous mixture and cement concrete which have been most commonly used as pavement. Further, it has the wear resistance 1.4 to 5.3 times higher than that of resin concrete or polymer-impregnated concrete block which has the most improved wear resistance in the prior art.

EXAMPLE 2

Example 2 was carried out to test the relation between curing period and bending strength. The skeleton concrete used in this test was Composition No. 3 shown in Table I of Example 1, and it was mixed in a biaxial pug mill mixer and was immediately spread evenly in a frame of 30 cm in length, 40 cm in width and 4 cm in thickness. Rolling compaction was applied, until a predetermined void ratio was achieved. In this way, four skeleton concrete pieces were prepared, and after they were cured in a room at a constant temperature of 20° C. for 0 hour, 3 hours, 5 hours and 17 hours, respectively, the fluid material of Composition No. d in Table II of Example 1 was applied. The fluid material was wholly spread by a rubber rake, and after the surface was smoothed, it was cured for a day. Then, it was cut by a concrete cutter to obtain nine test pieces of 4 cm in width for use in a bending test.

The bending test was made on the samples which were cured for a day, 2 days and 4 days, respectively, after the filling operation. The test was carried out by loading at a bisectional point with a span of 20 cm, at a load speed of 5 cm/min. and at a temperature of 20° C. The machine used in the test was Servopulser Lab-5u produced by Shimadzu Seisakusho Ltd. Table VI shows the results of the relation between curing period and bending strength.

TABLE VI

| Time Period from Formation of Skeleton Concrete to Filling of Fluid Material (Hour) | Bending Strength obtained by Curing for Days after Filling of Fluid Material (kgf/cm²) Cured | | |
|---|---|---|---|
| | 1 day | 2 days | 4 days |
| 0 | 49.5 | 59.4 | 71.0 |
| 3 | 62.6 | 73.7 | 74.6 |
| 5 | 62.7 | 80.2 | 82.7 |
| 17 | 67.4 | 82.3 | 84.4 |

As is apparent from Table VI, the paving mixture of Example 2 cured for a day has the strength greatly exceeding the design bending strength of 45 kgf/cm² of the conventional concrete pavement.

From the foregoing detailed description, it can be appreciated that the pavement of the present invention is quite superior in wear resistance and applicability to conventional asphalt concrete pavement, cement concrete pavement, resin concrete pavement or polymer-impregnated concrete block pavement.

In the pavement of the first aspect of the present invention, as coarse aggregate is combined by cement and voids are filled with the fluid material, wear loss due to studded tires and tire chains is small, the wear resistance is quite high. The pavement of the second aspect of the present invention includes coarse aggregate and fine aggregate, but the mixing proportion by volume of fine aggregate is minimized to be not more than 25%, so that wear loss due to studded tires and tire chains can be reduced and wear resistance becomes high. On account of the characterisitics of the thermo-setting resin used as the fluid material, the pavement of the present invention has good heat resistance, good chemical reistance and good shock resistance. Thus, the present invention is applicable not only to pavement of locations subject to wear but also to pavement of airport runways, floors in a plant or storehouse or the like subject to severe loading conditions. Furthermore, because of good wear resistance, the present invention is applicable as a lining material for a river bed, a dam crest or the like. When the skeleton concrete is formed in a thin layer of 5 mm in thickness on an existing road and the fluid material is applied, a portion of the fluid material introduced onto the existing road surface functions as an adhesive between the skeleton concrete and the existing road. Thus, the present invention is applicable to repair a worn road surface or to form a wear resisting layer on the existing road.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A pavement structure comprising a skeleton concrete formed by evenly spreading a mixture containing not less than 30% by volume of coarse aggregate, 2% to 20% by volume of cement and 3% to 20% by volume of water, said skeleton concrete including about 10%–40% by volume voids which are filled with a material containing a thermosetting resin, said voids being filled in situ with a hardenable fluid material comprising said thermosetting resin.

2. The pavement structure as defined in claim 1 wherein said coarse aggregate has a grain diameter not less than 2.5 mm.

3. The pavement structure as defined in claim 1 wherein said coarse aggregate is crushed stone.

4. The pavement structure as defined in claim 1 wherein said coarse aggregate is slag.

5. The pavement structure as defined in claim 1 wherein said coarse aggregate is artificial aggregate.

6. The pavement structure as defined in claim 1 wherein said cement is hydraulic cement.

7. The pavement structure as defined in claim 1 wherein said cement is air-setting cement.

8. The pavement structure as defined in claim 1 wherein said thermosetting resin constituting the fluid material is epoxy resin.

9. The pavement structure as defined in claim 1 wherein said thermosetting resin constituting the fluid material is unsaturated polyester resin.

10. The pavement structure as defined in claim 1 wherein said fluid material is a mixture of the thermosetting resin with a filler.

11. A pavement structure comprising skeleton concrete formed by evenly spreading a mixture containing not less than 30% by volume of coarse aggregate, not more than 25% by volume of fine aggregate, 2% to 20% by volume of cement and 3% to 20% by volume of water, said skeleton concrete including about 10%–40% by volume voids which are filled with a material containing a thermosetting resin, said voids being filled in situ with a hardenable fluid material comprising said thermosetting resin.

12. The pavement structure as defined in claim 11 wherein said coarse aggregate has a grain diameter not less than 2.5 mm and said fine aggregate has a grain diameter less than 2.5 mm.

13. The pavement structure as defined in claim 11 wherein said coarse aggregate and fine aggregate are crushed stone.

14. The pavement structure as defined in claim 11 wherein said coarse aggregate and fine aggregate are slag.

15. The pavement structure as defined in claim 11 wherein said coarse aggregate and fine aggregate are artificial aggregate.

16. The pavement structure as defined in claim 11 wherein said cement is hydraulic cement.

17. The pavement structure as defined in claim 11 wherein said cement is air-setting cement.

18. The pavement structure as defined in claim 11 wherein said thermosetting resin constituting the fluid material is epoxy resin.

19. The pavement structure as defined in claim 11 wherein said thermosetting resin constituting the fluid material is unsaturated polyester resin.

20. The pavement structure as defined in claim 11 wherein said fluid material is a mixture of the thermosetting resin with a filler.

* * * * *